BINARY DIGITAL COMPUTING AND COUNTING APPARATUS

Filed June 27, 1951 3 Sheets-Sheet 1

Inventor:
Burton R. Lester,
by Merton D. Moore
His Attorney.

Feb. 12, 1957 B. R. LESTER 2,781,447

BINARY DIGITAL COMPUTING AND COUNTING APPARATUS

Filed June 27, 1951 3 Sheets-Sheet 2

Inventor:
Burton R. Lester,
by Merton D. Moore
His Attorney.

Inventor:
Burton R. Lester,
by Merton D. Morse
His Attorney.

2,781,447

BINARY DIGITAL COMPUTING AND COUNTING APPARATUS

Burton R. Lester, Camillus, N. Y., assignor to General Electric Company, a corporation of New York Application June 27, 1951, Serial No. 233,803

10 Claims. (Cl. 250—27)

Figures 1, 2:
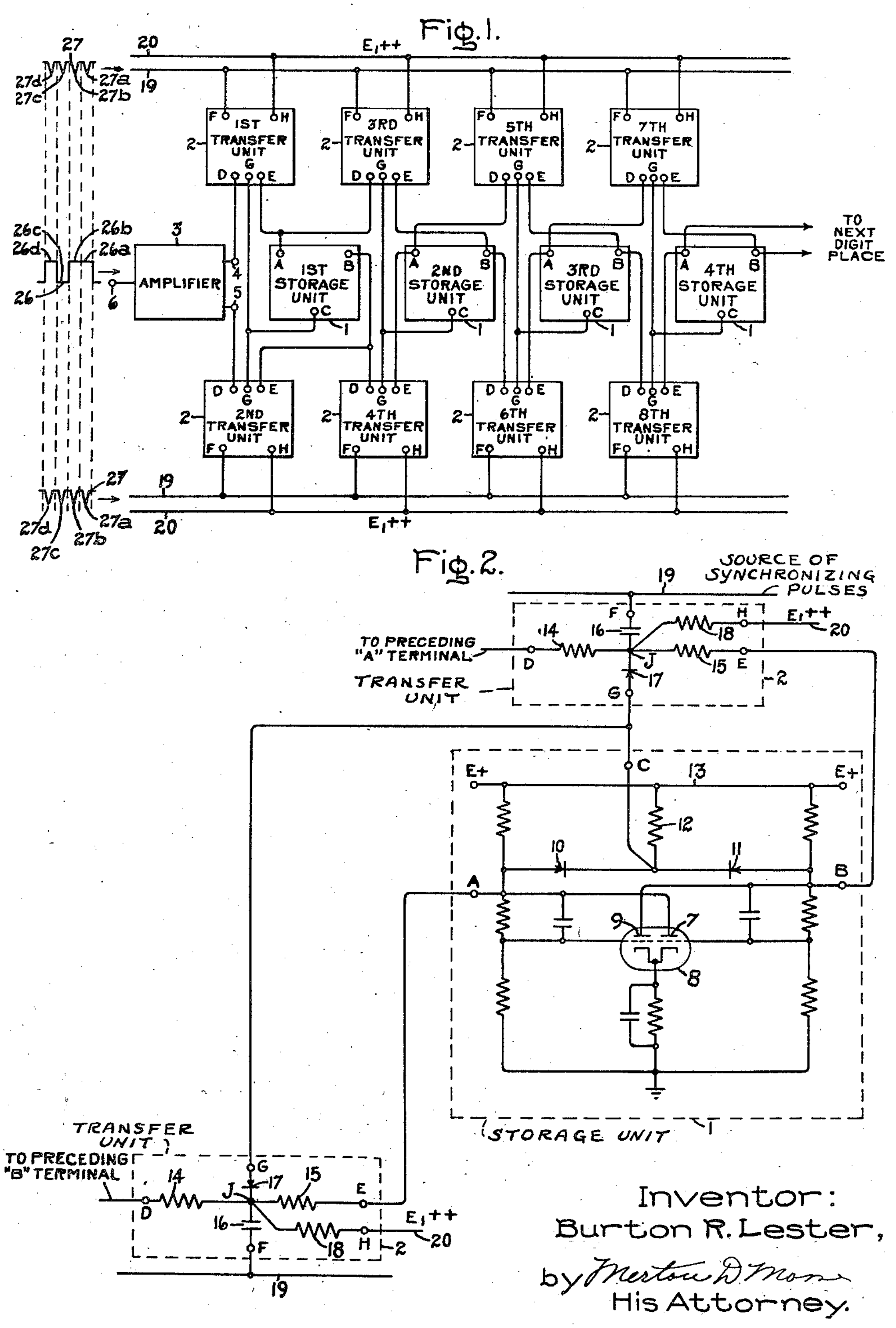

My invention relates to binary digital computing and counting devices such as those employing a binary or coded binary number system and more particularly to shifting registers, decade counters, and to transfer units for sensing the conditions of two or more storage units in such registers and counters and either allowing or not allowing one of the storage unit conditions to be changed according to the principles under which the register or counter is operated.

In the binary system of numbers, there are only two possible numbers which are usually expressed as "1" and "0" although it is possible to think of the two as being "on-off," "yes-no," "good-bad," etc. To represent any whole decimal number, it is only necessary to assign each digit in a binary expression a value corresponding to the number 2 raised to a successive power and then indicate the presence or absence of that value in the expression, for example, by a "1" or a "0" respectively in the digit place. The well-known binary number system is thus illustrated by the following table which shows at the top the values assigned to the respective binary digit places.

| Binary system $2^n$ | $2^3$ | $2^2$ | $2^1$ | $2^0$ | | Decimal system |
|---|---|---|---|---|---|---|
| | 0 | 0 | 0 | 0 | = | 0 |
| | 0 | 0 | 0 | 1 | = | 1 |
| | 0 | 0 | 1 | 0 | = | 2 |
| | 0 | 0 | 1 | 1 | = | 3 |
| | 0 | 1 | 0 | 0 | = | 4 |
| | 0 | 1 | 0 | 1 | = | 5 |
| | 0 | 1 | 1 | 0 | = | 6 |
| | 0 | 1 | 1 | 1 | = | 7 |
| | 1 | 0 | 0 | 0 | = | 8 |
| | 1 | 0 | 0 | 1 | = | 9 |
| | 1 | 0 | 1 | 0 | = | 10 |
| | 1 | 0 | 1 | 1 | = | 11 etc. |

The use of the binary number system is particularly facilitated, as is known by those skilled in the computer art, by the use of fast acting Eccles-Jordan "flip-flop" or triggered multivibrator circuits which have only two stable states of conduction, one of which may be designated as representing a binary "1" and one of which may be designated as reprsenting a binary "0." By assembling a series of these multivibrator circuits, i. e., a register, letting each represent one binary digit place, and causing each to be in the proper conduction state, any binary number can be represented electrically. Since the multivibrator circuits remain in a given conduction state until excited by an externally initiated voltage pulse which causes them to switch to the other state, they are commonly called "storage units," for by this nature they "store" or hold the binary number they represent in a given conduction state until externally excited. By properly causing external pulses to switch the various storage units in a given manner, it is possible to have addition, subtraction, multiplication, and other mathematical operations automatically performed on numbers stored in binary form within one or more registers.

One of the useful parts of an electronic binary computer is a shifting register wherein a string of binary digits may be shifted along from one storage unit to the next.

This is necessary in most multiplication operations and in reading a binary expression in or out of a register. For example, to store the decimal number 11 in a register of four storage units, it is neither desirable nor convenient to have the register act as a counter so that the input has to be pulsed 11 times. Instead, a D. C. signal voltage train having two portions indicative of binary "1," a portion indicative of binary "0," and another portion indicative of binary "1," in that sequence, is supplied to the shifting register and corresponding conduction states shifted along the storage units by transfer units which permit certain storage units to be properly triggered by four pulses from a pulsing bus or source.

In electronic binary counters, the same type of storage units are employed in a counter chain which represents by its conduction states at any instant the binary expression for the total number of electric pulses having been supplied to it. In order that a large decimal number be conveniently represented by a given number of storage units, the storage units are sometimes combined in groups of four, each group being able to represent one decimal digit, i. e., 0 through 9. Such groups are termed decade counters and a series of decade counters may be assembled so that each represents one digit place in an over-all decimal number. The range of decimal numbers expressible in four binary digits is 0 to 16, so that it is necessary to code the binary system in order that each decade counter returns to 0 and pulses the next decimal place decade counter after 10 pulses are applied. There are other advantages in using coded systems which make complementing and certain other mathematical operations more simple, and several such codes each having different advantages are being used at the present time. In a coded decade counter, however, the pulses applied to the counter do not progress through the storage units in normal binary fashion, and it is necessary to supply a transfer unit between certain storage units to sense the condition of the group and route the pulses to change only the proper storage units for any single input pulse.

It is an object of my invention to provide a new and improved selective transfer unit for electronic computers and counters.

It is a second object of my invention to provide a transfer unit for electronic computers and counters which is fast acting, being capable of selectively transferring pulses as fast as any practical storage unit can accept them.

It is a third object of my invention to provide a transfer unit which enables the storage units in a computer register or counter chain to be pulsed only when necessary without being put through two reversals of conduction states to arrive at the original conduction state.

It is a fourth object of my invention to provide a transfer unit which is simple and economical in construction thereby eliminating many vacuum tubes heretofore deemed necessary in computer registers and counter chains.

It is a fifth object of my invention to provide a new and improved shifting register for use in binary digital computing devices.

And it is a sixth object of my invention to provide a new and improved coded binary decade counter.

Briefly stated, my invention in one form thereof comprises a voltage dividing network of impedance elements which is connected between the oppositely designated anodes of two storage units. A junction of the dividing network can assume three potentials—low when the two anodes are conducting and are at low potential, intermediate when one anode is conducting and the other is not conducting, and high when the two anodes are not conducting and are at high potential. The junction point is connected through a rectifier to the common trip point of the second storage unit and is also connected through a capacitor to a pulsing bus bar. The potential of the common trip point in the second storage unit is always the same during either stable condition of the storage unit. By proper choice of voltage polarities, voltage pulses from the pulse bus bar are thus transmitted through the rectifier to trip the second storage unit to its opposite conduction state only when the two anode potentials combine to produce the proper potential at the impedance junction which is the proper polarity with respect to the common trip point to make the rectifier conductive. In another form in combination with storage units, the transfer unit may be connected to attenuate pulses when the junction is at certain potentials by shorting them to ground thereby providing a new decade counter. And in still a third application, the potential of the junction point of the impedance elements may be derived from the comparison of one anode potential with a constant supply potential to provide another mode of decade counter operation.

Figure 3:
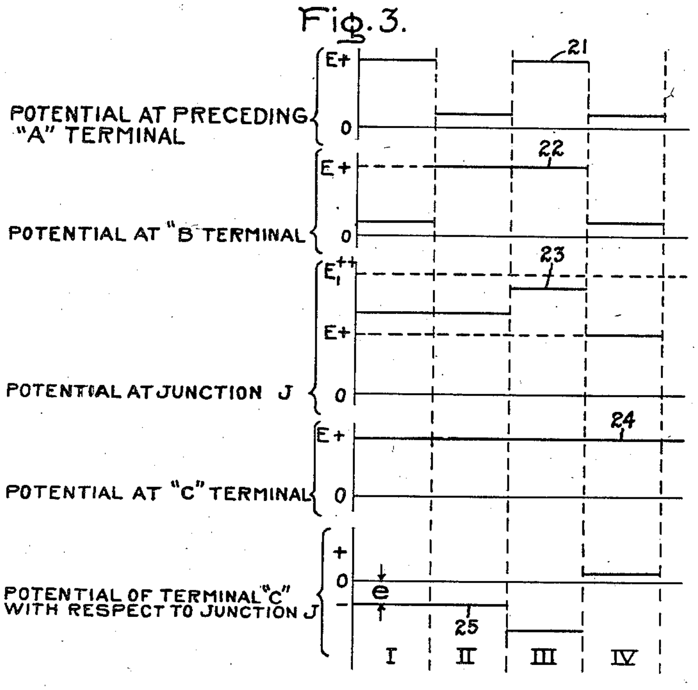
Figure 4:
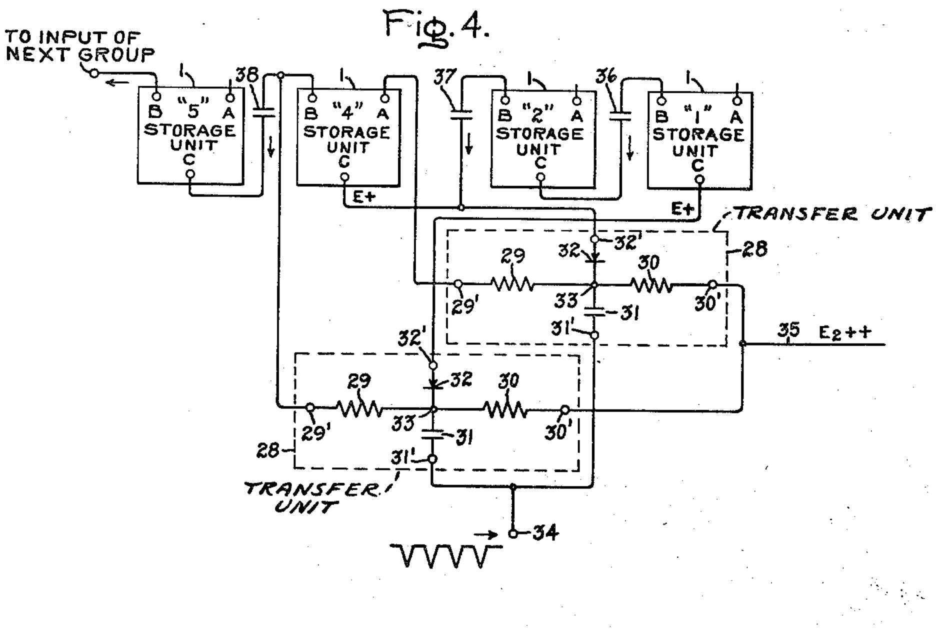
Figure 5:
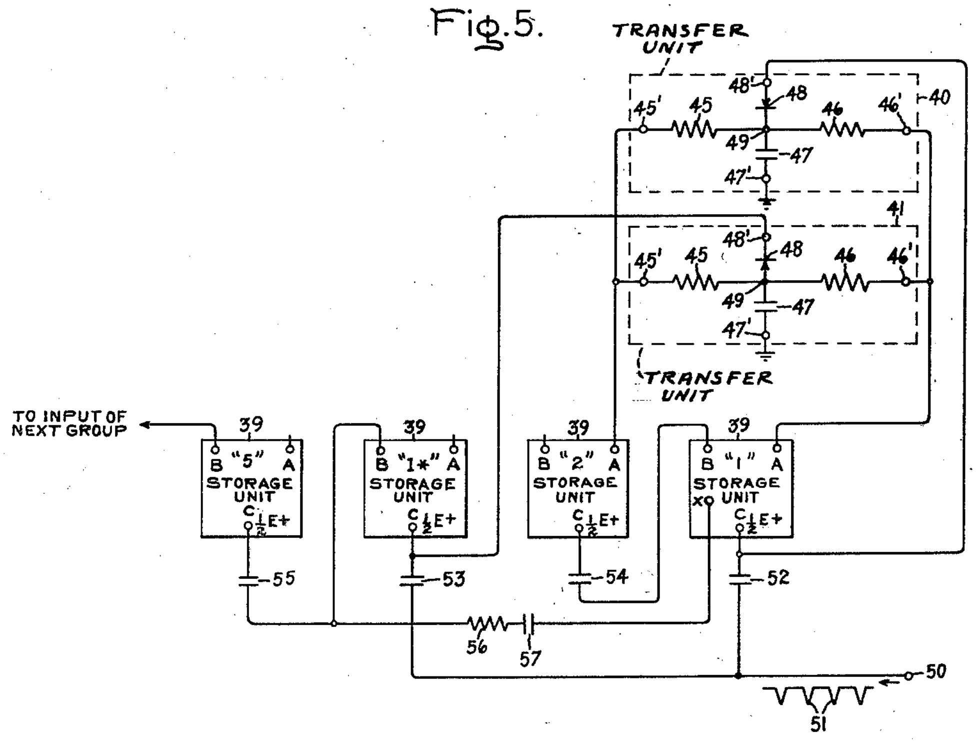
Figure 6:
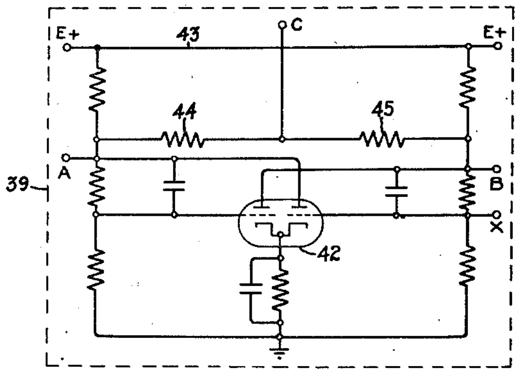

The novel features of my invention are pointed out with particularity in the appended claims. However, for a better understanding of the invention together with further objects and advantages thereof, reference should be had to the following description taken in conjunction with the accompanying drawings in which:

Fig. 1 is a diagrammatic representation, in block and line form, of a shifting register employing storage units and the transfer units of my invention; Fig. 2 is a schematic circuit diagram of a storage unit and two associated transfer units as represented in Fig. 1; Fig. 3 is a series of potential curves illustrating the possible potential combinations of certain points in the circuit of Fig. 2 and conditions under which the transfer units of Figs. 1 and 2 transmit voltage pulses; Fig. 4 is a schematic diagram, partly in block form, of a coded binary counter group illustrating another embodiment of the transfer unit of my invention; Fig. 5 is a schematic diagram, partly in block form, of a second coded binary counter group illustrating yet another modification of the transfer unit of my invention; and Fig. 6 is a schematic diagram of one of the storage units represented by block form in Fig. 5.

Referring now to Fig. 1, there is shown a plurality of storage units 1 interconnected with a plurality of transfer units 2 embodying my invention, to form an improved shifting register. An input amplifier 3 having two output terminals 4 and 5 and an input terminal 6 is also connected to the left end of the register by two transfer units 2 to function in a manner to be described hereinafter.

Each storage unit 1 is identical to the triggered multivibrator circuit shown and enclosed by dashed lines in Fig. 2 and may be, for example, of the type described and claimed in my United States Patent No. 2,554,994, issued May 29, 1951, and assigned to the assignee of the present invention. I have illustrated the storage unit as having three main terminals; an output terminal A being connected to a right-hand anode 7 of a twin triode 8, an output terminal B being connected to a left-hand anode 9, and a terminal C serving as a common triggering input terminal. Terminal C is connected through rectifiers 10 and 11 to anodes 7 and 9 respectively, so that a negative voltage pulse applied at terminal C triggers the storage unit to its opposite conduction state, and through a resistor 12 to a positive voltage supply conductor 13 which maintains terminal C during stable conditions of the multivibrator circuit at the positive potential, E+, of voltage supply conductor 13. Storage unit 1 operates in a well known manner for triggered multivibrator circuits, having two stable states of conduction. Either anode 7 or anode 9 conducts current at any one time but both anodes cannot conduct simultaneously. They therefore reside complementally each at one of two predetermined potentials during either conduction state. Whichever anode is conducting at any one time resides at a relatively low potential with respect to E+ while the nonconducting anode resides at a relatively high complementing potential approximately equal to E+. This condition prevails until a negative voltage pulse is applied to terminal C to upset the stable conditions, whereupon the two anodes 7 and 9 rapidly switch conduction and potentials. It is to be understood that other types of triggered multivibrator circuits than the one shown by way of illustration may be employed successfully with the transfer units of the present invention and that positive voltage tripping pulses may be used with equal success in some such circuits.

I prefer to say that a storage unit 1 stores or holds a binary "1" whenever anode 7 is conducting and terminal A is at low potential. With this arbitrary definition, which could just as conveniently be assumed in the opposite sense, the output terminals A and B and the anodes 7 and 9 are oppositely designated and the following conditions may be stated for a storage unit 1:

| Binary No. Stored | Potential At Term. A | Potential At Term. B | Potential At Term. C |
|---|---|---|---|
| 1 | low | high (E+) | high (E+). |
| 0 | high (E+) | low | high (E+). |

The transfer units 2 are illustrated in Fig. 2 in schematic form, enclosed by dash lines and associated with the schematic diagram of a storage unit 1. Each transfer unit is a multiterminal potential-comparing and selective transmission network including a plurality of impedance elements connected in star arrangement to a common junction point. The various terminals are for sensing voltages, receiving input voltage pulses, and transmitting output voltage pulses only under certain predetermined conditions of the sensed potentials at storage unit anodes which represent certain conditions of number information. The transfer unit in Figs. 1 and 2 each comprise two identical resistors 14 and 15, a capacitor 16, a rectifier 17, and a third resistor 18, all meeting at a common junction point, J. Rectifier 17 in this embodiment of the present transfer units is poled to conduct current, in a conventional sense, only toward junction J. The main terminal connection points; i. e., a first and second resistor terminal, a capacitor terminal, a rectifier terminal, and a third resistor terminal; opposite junction J for each transfer unit have been designated as terminals D, E, F, G and H respectively as shown.

There are two transfer units associated with each given storage unit in the shifting register of Fig. 1 as shown by Fig. 2, the input terminal F of each being connected to receive triggering pulses from a pulse source or pulsing bus 19, the output terminal G of each being connected to the triggering terminal C of the associated storage unit 1, the sensing terminal E of each being connected respectively to the A and B terminals of the given storage unit, and the sensing terminals D of each being connected respectively to the B and A terminals of the preceding storage unit, i. e., the one on the left of the given storage unit, in the register. The sensing terminal H of each transfer unit is provided for connection to a positive voltage supply conductor 20, which is at a positive potential, $E_1$++, greater (preferably about two times greater) than the potential E+ of supply conductor 13. While two pulsing buses 19 and two supply conductors 20 are shown in Figs. 1 and 2, it is to be understood that this is by way of convenience in the diagrammatic representations; the two illustrated pulsing buses 19 may be one and the same, and the two supply conductors 20 may be one and the same.

Referring again to Fig. 2, it will be seen that the transfer units 2 are essentially multiterminal potential-comparing networks including resistors, capacitors and rectifiers connected in star arrangement which compare the potentials at two or more points and transmit pulses received at one terminal to another terminal only under certain predetermined conditions. Thus, the transfer units may be properly termed "selective" since they automatically determine when a received pulse is to be transmitted. In the embodiment of the transfer units shown in Figs. 1 and 2, it is desirable that negative voltage pulses received at input terminals F be transmitted to terminals G, which are at high potential, only when terminals D and E are at a very low potential. The reasons for this will become apparent during the following explanation of the operation of the shifting register of Fig. 1. The relative magnitudes of resistors 14, 15, and 18 are so chosen that the junction J will reside approximately at E+ potential when the potentials of terminals D and E are at the "low" potentials of conducting anodes.

Consider now the series of curves shown by Fig. 3. Curves 21 and 22 illustrate by four cases, I, II, III, and IV, the potential combinations which may be assumed by the A terminal of a preceding storage unit and the B terminal of a given storage unit. In case I, the preceding A terminal potential is high, indicating a binary "0" stored in the preceding storage unit, while the B terminal potential is low, indicating a binary "0" stored in the given storage unit. In case II, the conditions of case I are reversed. In case III, the preceding A terminal potential is high, indicating a binary "0" stored in the preceding storage unit, while the B terminal is high, indicating a binary "1" stored in the given storage unit. In case IV both the preceding A and the B terminal potentials are low, indicating a binary "1" and a binary "0" in the preceding and given storage units respectively. Curve 23 illustrates the potential resulting at the junction J as these combinations occur, it being remembered that resistance 18 connected to supply conductor 20 at $E_1$++ potential maintains junction J at approximately E+ potential when terminals D and E are both at the low potentials of conducting anodes. Curve 24 illustrates that the potential of terminal C of the given storage unit (and terminal G of the transfer unit) remains at a positive E+ potential for any of the aforesaid combinations since rectifiers 10 and 11 and resistor 12 act to effectively connect terminal C to supply conductor 13. Curve 25, then, illustrates the potential of terminal C with respect to junction point J for any of the four combinations. It will be seen that terminal C is always negative with respect to junction J except in case IV when both the preceding A terminal and the B terminal are at low potentials. Remembering that rectifier 17 may be considered as an open switch when terminal C is negative with respect to junction J and as a closed switch when terminal C is positive with respect to junction J, it will be seen that a negative voltage pulse arriving from pulsing bus 19 will be transmitted to terminal C to trigger the given storage unit only when case IV exists. It is to be noted, however, that the potential $E_1$++ should be chosen, for a given E+ supply and magnitude of negative voltage tripping pulses required for the storage unit, so that the negative pulse is not greater in amplitude than the amount "*e*" in Fig. 3 by which terminal C is negative with respect to junction J during the existence of cases I and II.

In accordance with my invention the combination of storage units 1 and transfer units 2 forms a shifting register in which the selective transfer units 2 are interconnected so that triggering pulses from the pulse source 19 reach a given storage unit and trigger it, if and only if, the conduction states and binary numbers stored by the given storage unit and the storage unit preceding it in the shifting direction are unlike. The transfer units 2 illustrated in Figs. 1 and 2 are new and improved potential sensing and selective pulse transmission networks which perform the selective action of pulse routing in accordance with the shifting register of my invention. Considering now that there are two transfer units connected between each pair of succeeding storage units as shown in Fig. 1, it will be apparent that terminal C is pulsed and the given storage unit triggered each time that a negative voltage pulse is supplied by pulsing bus 19 if and only if the preceding storage unit stores a different binary member at the time of the pulse. Turning again to Fig. 1 to consider the operation of the shifting register, amplifier 3 may be a two stage positive feed-back D. C. amplifier of the type more fully described both as to circuitry and operation as a component in the copending application Serial No. 237,852, filed July 21, 1951, in the name of W. C. Hahn and assigned to the assignee of the present invention. Amplifier 3 has an output terminal 4 which is at high potential, say E+, when its input voltage is high, i. e., above a predetermined critical positive voltage and which is at low potential, near ground potential, when the input voltage is low, i. e., below the predetermined positive voltage. Conversely, output terminal 5 is low in potential when the input voltage is high and high in potential when the input voltage is low. Thus, output terminals 4 and 5 may be considered as B and A terminals respectively of a storage unit which stores a binary "1" when the input to terminal 6 is high and a binary "0" when the input to terminal 6 is low. Assume that all storage units are initially storing a binary "0" and it is desired to shift the decimal number 11 into the register. A D. C. voltage train such as that illustrated by curve 26 may be applied to the input of amplifier 3. Such a voltage train might be a shaped playback voltage from a magnetically recorded tape, for example. Simultaneously, a suitable negative voltage pulse source, i. e., pulsing bus 19, provides a synchronized negative voltage pulse train such as that illustrated by curve 27. At the instant that the first negative voltage pulse 27*a* arrives at the F terminals of transfer units 2, output terminal 5 and the B terminal of the first storage unit 1 are low in potential, since the input to amplifier 3 is low (portion 26*a*) and the first storage unit holds a binary "0." Therefore, the second transfer unit 2 transmits the first negative voltage pulse 27*a* to terminal C of the first storage unit 1 and triggers it to store a binary "1." It will be seen by inspection that none of the other transfer units 2 transmit the first negative voltage pulse 27*a* since the potentials of their terminals D and E are not both low. At the instant that the second negative voltage pulse arrives at the F terminals of transfer units 2 (and the input to terminal 6 is high due to input portion 26*b*) terminal A of the first storage unit 1 and terminal B of the second storage unit 1 are both low in potential. Thus, the third transfer unit transmits the second negative voltage pulse 27*b* to terminal C of the second storage unit 1 causing it to be triggered and store a binary "1." Again it will be seen that none of the other transfer units 2 transmit the second negative voltage pulse 27*b* since the potentials of their D and E terminals are not both low. When the third negative voltage pulse 27*c* arrives at the F terminals of the transfer units 2 (and the input to terminal 6 is low due to input portion 26*c*), the D and E terminals of the first and fifth transfer units are all low in potential. Therefore, the third negative voltage pulse 27*c* is transmitted only to the first and third storage units 1, triggering the first storage unit 1 to store a binary "0" and the third storage unit 1 to a store a binary "0" and the third storage unit 1 to store a binary "1." Notice that the second storage unit 1 was not triggered at all since it contained a binary "1" and the first storage unit 1 also contained a binary "1." The shifting of the binary "1" in the first storage unit 1 to the right and thus to the second storage unit 1 was accomplished by leaving the original "1" in the second storage unit. It was not necessary to trigger the second storage unit to a "0" condition and then retrigger it back to a "1" condition. At the instant that the fourth negative voltage pulse 27*d* arrives at terminals F of the transfer units 2 (and the input to terminal 6 is again high due to input portion 26*d*), the D and E terminals of the second, fourth, and seventh transfer units 2 are all low in potential. Therefore, the first, second, and fourth, but not the third, storage units 1 receive the fourth negative voltage pulse 27*d* and are triggered to opposite conditions of conduction. The storage units then represent 1011 which is the binary expression for the decimal number 11, having been brought to this representation by successive shifting to the right in the register in response to four negative voltage pulses and a proper D. C. input signal.

From the foregoing, it will be obvious that such a shifting register containing any number of storage units may be constructed by following the pattern set forth in Fig. 1 and that such a shifting register may be made to shift to the right or the left or in both directions by the use of potential sending selective transmission networks such as transfer units 2. The novel features of the shifting register of the present invention may be summarized as follows: In response to negative voltage pulses only the storage units which are in an opposite state of conduction to the storage unit on their immediate left are changed. There is no double switching in the shifting process. Further, the transfer units in themselves are simple and economical to construct, no vacuum tubes being required therein since rectifier 17 may conveniently be of the crystal diode type. The speed with which the negative voltage is supplied is limited only by the highest rate at which the storage units may be successfully triggered.

Referring now to Fig. 4, I have shown a biquinary or coded binary decimal counter as an application of a second embodiment of the transfer units of the present invention. The use of this embodiment makes possible a simpler and more direct reading decimal counting group of storage units. In this decimal counter a 5421 code is used so that the decimal number stored in the group for the various combinations of conduction states for the storage units is arbitrarily designated as follows:

| Coded binary expression | | Decimal No. |
|---|---|---|
| 5 4 2 1 | | |
| 0 0 0 0 | = | 0 |
| 0 0 0 1 | = | 1 |
| 0 0 1 0 | = | 2 |
| 0 0 1 1 | = | 3 |
| 0 1 0 0 | = | 4 |
| 1 0 0 0 | = | 5 |
| 1 0 0 1 | = | 6 |
| 1 0 1 0 | = | 7 |
| 1 0 1 1 | = | 8 |
| 1 1 0 0 | = | 9 |

The decimal storage group includes four storage units 1 which are identical to the storage unit 1 illustrated by schematic diagram in Fig. 2. Two transfer units 28 which are a modification of the transfer units 2 of Figs. 1 and 2 are shown enclosed by dashed lines. The transfer units 28 are multiterminal voltage comparing and selective transmission networks comprising resistors, capacitors, and rectifiers so arranged to compare two or more potentials and transmit voltage pulses from one terminal to another only under certain conditions of the sensed potentials and the number information represented thereby. Each transfer unit 28 includes two resistors 29 and 30, a capacitor 31, and a rectifier 32 connected together as shown to a common junction 33 and forming sensing resistor terminals 29' and 30', a capacitor input terminal 31', and a rectifier output terminal 32'. Sensing terminal 29' of one transfer unit 28 in Fig. 4 is connected to the B terminal of the "4" storage unit to sense the potential at that point, while output terminal 32' of the same transfer unit is connected to the C trigger terminal of the "1" storage unit, as shown. The other transfer unit 28 is connected from its sensing terminal 29' to the A terminal of the "4" storage unit and from its output terminal 32' to the C trigger terminal of the "4" storage unit. Both input terminals 31' are connected to a common input terminal 34 over which negative voltage pulses to be counted are supplied. Both sensing terminals 30' are connected to a source of potential represented by a supply conductor 35 which resides at some positive potential $E_2{+}{+}$ greater than the E+ supply potential for each storage unit. It will be remembered from the previous description that the C terminal of a storage unit 1 resides at the E+ potential during either conduction state of the storage unit. Now the ratio of the resistance values for resistors 29 and 30 for given E+ and $E_2{+}{+}$ magnitudes is chosen so that junction 33 resides approximately at E+ potential when and only when the sensing terminal 29' is at the low potential of a conducting anode. When this condition prevails, i. e., the anode to which terminal 29' is attached is conducting, the potential of junction 33 is approximately the same as the potential at output terminal 32' and rectifier 32 will pass a negative voltage pulse applied to input terminal 31'. Conversely, when the anode to which terminal 29' is attached is not conducting and is at high potential, junction 33 is considerably more positive in potential than output terminal 32' which is at the E+ potential of the storage unit C terminal, and negative voltage pulses equal to or less in magnitude than this potential difference will not be passed by rectifier 32.

Coupling capacitors 36, 37, and 38 are connected from the E terminals of the "1," "2," and "4" storage units as shown but no feedback from the "5" storage unit to the "1" storage unit is necessary as will be apparent from the following explanation of the counter operation. The B terminal of the "5" storage unit may be connected to the input terminal of the next group of storage units representing the next decimal digit. It will be apparent that any sort of conduction state indicating means, such as neon glow tubes, may be incorporated into each storage unit to indicate when the unit stores a binary "1" and when it stores a binary "0."

With the understanding of transfer units 28 and their actions, the operation of the counter group of Fig. 4 may be readily described. Assume that all the storage units are initially storing binary zeros, i. e., all A terminals are high in potential and all B terminals are low in potential. When the first negative voltage pulse arrives at input terminal 34, it is transmitted through the transfer unit 28 which is connected to the C terminal of the "1" storage unit, since the B terminal of the "4" storage unit is at its low potential. However, the other transfer unit does not transmit the pulse, since the A terminal of the "4" storage unit is at its high potential. When the second, third, and fourth voltage pulses are supplied to the counter group, the transfer units respond in the same manner, only the "1" storage unit being triggered. A second pulse returns the "1" storage unit to the binary "0" condition and the resultant negative voltage pulse generated at the B terminal thereof is transmitted through capacitor 36 to the "2" storage unit which is thereby triggered to store a binary "1." Since positive voltage pulses generated at the B terminal and coupled to C terminals have no triggering effect upon the storage units, a third input pulse simply causes the "1" storage unit to store a binary "1" so that the group representation is 0011, equal to the decimal number 3. The fourth input voltage pulse, from the foregoing, causes the "1" and "2" storage units to be triggered to the binary "0" condition and the "4" storage unit to be triggered to the binary "1" condition. At this point, the potential sensed by terminals 29' of the transfer units 28 are reversed, so that the fifth input voltage pulse does not reach the "1" storage unit but it is transmitted directly to the "4" storage unit, triggering that storage unit to the binary "0" condition and triggering, through capacitor 38, the "5" storage unit to the binary "1" condition as a result. However, after the 5th input pulse, with the "4" storage unit in the binary "0" condition, the next four input voltage pulses cause the counter group to react exactly as it did to the first four input pulses. After 9 input pulses the group representation is 1100, equal to the decimal number 9, and the transfer units are sensing the same potentials as they did just before the fifth input pulse occurred. Consequently, the 10th input pulse is transmitted only to the "4" storage unit, triggering it to the "0" binary condition and, as a result, causing the "5" storage unit to also be triggered to the "0" binary condition. Thus, after 10 input pulses, the group is back to its original 0000 representation and ready to begin the count over. Each time that the "5" storage unit is triggered from the binary "1" to "0" condition (as a result of every tenth input pulse), a negative voltage pulse generated at its B terminal may be supplied to a second identical counter group for counting in the next decimal digit place. Thus, any range of numbers could be counted by arranging the groups in decade relationship, one group for each digit in the decimal number to be counted.

A primary feature of this counter is that it requires no feedback from the third digit storage unit to the second and first digit storage units by the use of transfer units 28. The use of feed-back pulses in a coded group adds greatly to the instability of the group; unless the feed-back path delays the feed-back pulses sufficiently they may fall so closely spaced in time to the initial input pulse that the first and second digit storage units cannot distinguish between the original and the feed-back pulses. The insertion of delaying elements in the feed-back path reduces the maximum rate at which input pulses can be counted. And even then, the first and second digit storage units are triggered twice to end up at their original conduction condition. The transfer units 28 thus make possible a more desirable counter system.

Turning next to Fig. 5, I have shown a third embodiment of the transfer unit of my invention employed in a novel biquinary or coded binary decimal counter group. The counter group comprises four identical storage units 39, which are illustrated more clearly by a schematic form in Fig. 6, and two transfer units 40 and 41. This decimal counter group is designed to operate on the coded binary or biquinary system 51*21, the numbers indicating the value assigned to each binary digit in a four place binary expression. The 1* in the third digit place is so marked to distinguish it from the 1 in the first digit place. The binary expressions for the decimal numbers 0 through 9 are as follows:

| Coded binary expression 5 | 1* | 2 | 1 | | Decimal number |
|---|---|---|---|---|---|
| 0 | 0 | 0 | 0 | = | 0 |
| 0 | 0 | 0 | 1 | = | 1 |
| 0 | 0 | 1 | 0 | = | 2 |
| 0 | 0 | 1 | 1 | = | 3 |
| 0 | 1 | 1 | 1 | = | 4 |
| 1 | 0 | 0 | 0 | = | 5 |
| 1 | 0 | 0 | 1 | = | 6 |
| 1 | 0 | 1 | 0 | = | 7 |
| 1 | 0 | 1 | 1 | = | 8 |
| 1 | 1 | 1 | 1 | = | 9 |

It is necessary to make the storage units assume these expressions in sequence; and the transfer units 40 and 41 make this possible with more convenience and speed than is attainable in systems employed heretofore.

The storage units 39 are basically the same as the storage unit 1 illustrated schematically in Fig. 2. Referring to Fig. 6, it will be seen that each storage unit 39 includes a twin triode 42 connected essentially as in Fig. 2 and supplied with power from a supply conductor 43 at E+ potential. However, triggering terminal C is connected to the two anodes through two identical resistors 44 and 45 so that it is always at a potential half way between the high potential (E+) of the nonconducting anode and the very low potential of the conducting anode during either stable conduction state of the storage unit, which is approximately one-half E+. Also, a terminal X is provided from the control grid governing conduction of the A terminal anode as shown. A negative voltage pulse applied to the X terminal when the storage unit stores a binary "0" and terminal A is at high potential will have no effect; but a negative voltage pulse applied to the X terminal when the storage unit stores a binary "1" and terminal A is at low potential will cause the storage unit to be triggered to the binary "0" condition. Aside from these slight differences, storage units 39 operate in the manner explained for storage units 2 of Figs. 1 and 2.

Returning to Fig. 5, transfer unit 40 is basically similar to the transfer units 28 of Fig. 4, while transfer unit 41 is a modification which has the rectifier therein connected in opposite sense. Again, transfer units 40 and 41 are multiterminal potential comparing and selective pulse transmission networks of impedance elements, but in this use are arranged to pass transmitted pulses to ground under certain conditions, thereby destroying the triggering effect of the pulses on certain storage units under predetermined relationships of the sensed anode potentials. Each of the transfer units 40 and 41 includes two resistors 45 and 46, which in this illustration are preferably identical resistors, a capacitor 47 and a rectifier 48 all connected together in star relationship to a common junction 49. Note, however, that rectifier 48 in transfer unit 40 is connected to conduct current, in a conventional sense, only into junction 49, while rectifier 48 in transfer unit 41 is connected to conduct current only away from junction 49. Transfer units 40 and 41 are each provided with sensing resistor terminals 45′ and 46′, capacitor output terminals 47′, and rectifier input terminals 48′ as shown. The sensing terminals 45′ are both connected to the A terminal of the "2" storage unit while both sensing terminals 46′ are connected to the A terminal of the "1" storage unit. Both output terminals 47′ are connected to ground. Input terminal 48′ of transfer unit 40 is connected to the C triggering terminal of the "1" storage unit and input terminal 48′ of transfer unit 41 is connected to the C triggering terminal of the "1*" storage unit. A single input terminal 50 is provided for the entire counter group to receive negative voltage pulses, such as pulses 51, which are to be counted. Input terminal 50 is connected to the C triggering terminal of the "1" and "1*" storage units through capacitors 52 and 53 respectively. The B terminal of the "1" storage unit is connected to the C tripping terminal of the "2" storage unit through a capacitor 54; and similarly, the B terminal of the "1*" storage unit is connected to the C terminal of the "5" storage unit through a capacitor 55. A feed-back path, including a current limiting resistor 56 and a blocking capacitor 57, is connected also from the B terminal of the "1*" storage unit to the X terminal of the "1" storage unit.

Now transfer unit 40 will transmit negative voltage pulses applied at its input terminal 48′ to ground only when the potential of its junction 49 is at or near ground potential and is negative with respect to input terminal 48′ during the pulse. However, the potential at junction 49 is only near zero when the potential of both A terminals of the "1" and "2" storage unit are low indicating binary "1" stored in each; and it will be remembered that terminal C and input terminal 48′ are always normally at a potential of about one-half E+. Thus, only when the group stores —11, i. e., binary "1's" in the first two digits, the incoming negative voltage pulses will be transmitted to ground by transfer unit 40 and made ineffective in triggering the "1" storage unit.

On the other hand, transfer unit 41 will transmit negative voltage pulses applied at its input terminal 48′ to ground only when its junction 49 is positive with respect to its input terminal 48′ during the pulses. Since terminals C and 48′ are normally at about ½ E+ potential, transfer unit 41 will transmit pulses to ground whenever its junction is at ½ E+ potential or greater, but will not transmit pulses to ground whenever its junction 49 is near zero potential. Of course, the magnitude of the negative voltage pulses applied to the C terminals for triggering is limited to about ½ E volt by the actions of the rectifiers in some instances but a triggering pulse of this magnitude is more than sufficient to cause proper triggering. The combined action of the transfer units may be summarized in the following table, wherein the potentials given are only approximate.

| Dec. | Count, Binary | Pot. at Junc. 49 | Potential Difference Term. C to Junctions 49 | Response to Negative Pulse | |
|---|---|---|---|---|---|
| | | | | Unit 40 | Unit 41 |
| 0 | 0000 | E+ | +½ E | non-transmittal | transmittal. |
| 1 | 0001 | ½ E+ | 0 | do | Do. |
| 2 | 0010 | ½ E+ | 0 | do | Do. |
| 3 | 0011 | 0 | −½ E | transmittal | non-transmittal. |
| 4 | 0111 | 0 | −½ E | do | Do. |

With the operation of transfer units 40 and 41 in mind, the over-all operation of the counter group may be explained as follows. Assume that all storage units initially store a binary "0." The first, second, and third negative input pulses are not transmitted by transfer unit 40 since during the 0, 1, and 2 counts of the group, since the A terminals of the "1" and "2" storage units are not both low. Also, the first, second, and third negative input pulses are transmitted or shunted to ground by transfer unit 41 so that the "1*" storage unit is not triggered by these pulses. The first input pulse triggers the "1" storage unit to store a binary "1"; the second input pulse triggers the "1" storage unit to store a binary "0" therein, and the resulting negative pulse developed at the B terminal thereof triggers the "2" storage unit to store a binary "1"; the third input pulse triggers only the "1" storage unit to store a binary "1" therein, the resulting positive pulse at the B terminal of the "1" storage unit being ineffective in triggering the "2" storage unit. When the fourth negative input pulse arrives, the potential at junctions 49 is approximately zero so that it is transmitted by transfer unit 40 but not by transfer unit 41. The "1*" storage unit is triggered, therefore, to store a binary "1" while the other storage units are not triggered and the expression 0111 equal to 4 results. The fifth input pulse is handled in the same manner by the transfer units 40 and 41, the "1*" storage unit being triggered to store a binary "0" and the resulting negative pulse at the B terminal thereof causing the "5" storage unit to be triggered to store a binary "1." Also, this negative voltage pulse developed at the B terminal of the "1*" storage unit is applied over resistor 56 and capacitor 57 to the X terminal of the "1" storage unit and causes both the "1" and the "2" storage units to be triggered to store a binary "0." The expression of the group is then 1000=5. The next four input pulses cause the group to react in the same way as the first four input pulses and the tenth input pulse causes the group to react in the same way as the fifth input pulse except that the "5" storage unit is triggered to a binary "0," with the result that the group counts in decimal fashion. Since the tenth pulse causes the "5" storage unit to be triggered from a binary "1" to "0," the negative voltage pulse developed at the B terminal thereof may be applied as an input pulse to the next group representing the next higher decimal place. Convenient indicating means, such as neon lights, may be included in the storage units if it is desired.

The transfer units shown and described hereinbefore are thus seen to be advantageously used in a new shifting register and counter group, although their utility is not limited solely thereto. The transfer units are convenient and economical in construction and provide a shifting or counting action that is extremely fast and entails no double triggering of storage units. In physical construction, I prefer to use germanium diodes for the rectifiers although copper oxide rectifiers or even vacuum tube diodes would serve equally well. The actual size of the resistors employed is not of critical importance as long as their size ratios are chosen properly and no extreme loading results, as will be apparent to those skilled in the art. For any given transfer unit, the size of the capacitor connected between the junction and the output terminal should be large enough to easily pass the voltage pulses but small enough so that the time constant of the resulting resistance-capacitance circuit is short with respect to the period of repetition for the input pulses.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A shifting register for use in binary digital computers comprising the combination of at least two multivibrator storage units and at least one transfer unit; said storage units each having two oppositely designated output terminals and a triggering input terminal, and having two stable states of conduction each representative of one of two binary numbers during which said two output terminals complementally reside at one of two predetermined potentials, each of said storage units being responsive to voltage pulses applied to the triggering input terminal thereof which trigger the storage unit to its opposite conduction state; said transfer unit comprising a multiterminal potential sensing and selective transmisson network having at least two sensing terminals, an input terminal for receiving triggering voltage pulses, and an output terminal for transmitting said voltage pulses; said transfer unit being interconnected between said storage units to sense through said sensing terminals the potentials at one output terminal of each said storage units and transmit a voltage pulse received at the input terminal thereof to the triggering input terminal of the succeeding one of said storage units in the shiftng sequence only if the conduction states of said storage units are in a predetermined relation.

2. A shifting register for use in binary digital computing devices comprising the combination of at least two multivibrator storage units and at least two transfer units; said storage units each having two oppositely designated output terminals and a triggering input terminal, and having two stable states of conduction; each of said transfer units comprising a multiterminal potential sensing and selective transmission network having at least two sensing terminals, an input terminal for receiving triggering voltage pulses, and an output terminal for transmitting said voltage pulses; said transfer units being interconnected between said storage units to sense the potentials of said output terminals of said storage units and transmit triggering voltage pulses received at the input terminals of said transfer units to the triggering input terminal of the succeeding one storage unit in the shifting sequence when and only when the conduction states of said two storage units are unlike.

3. A shifting register for use in binary digital computers comprising the combination of a plurality of multivibrator storage units and a plurality of transfer units; said storage units each having two oppositely designated output terminals and a triggering input terminal, and having two stable states of conduction representative of two binary numbers during which said two output terminals complementally reside each at one of two predetermined positive potentials; each of said storage units being responsive to negative voltage pulses applied to the triggering input terminal thereof which trigger the storage unit to its opposite conduction state; said transfer units each comprising impedance elements including three resistors, a rectifier, and a capacitor connected to a common junction in star relationship and providing at the respective ends of said elements opposite said junction a first, second, and third resistor terminal, a rectifier terminal, and a capacitor terminal; said rectifier being poled to conduct current toward said junction; each pair of said transfer units being associated with a pair of storage units having succeeding positions in the shifting sequence; said first and second resistor terminals of each pair of transfer units being connected to sense potentials at the output terminals of the corresponding pair of storage units; said third resistor terminals of each pair of transfer units being provided for connection to a source of direct potential; said rectifier terminals of each pair of said transfer units both being connected to the triggering input terminal of the succeeding one of the corresponding pair of said storage units; each pair of said transfer units transmitting negative voltage pulses to cause triggering of the succeeding one of the corresponding pair of said storage units only if the binary numbers represented by each of said corresponding pair of said storage units are unlike.

4. A shifting register for use in binary digital computers comprising the combination of a plurality of multivibrator storage units and a plurality of transfer units; said storage units each having two oppositely designated ouput terminals and a triggering input terminal, and having two stable states of conduction representative of two binary numbers during which said two output terminals complementally reside each at one of two predetermined positive potentials; each of said storage units being responsive to negative voltage pulses applied to the triggering input terminal thereof which trigger the storage unit to its opposite conduction state; said transfer units each comprising impedance elements including three resistors, a rectifier, and a capacitor connected to a common junction in star relationship and providing at the respective ends of said elements opposite said junction a first, second, and third resistor terminal, a rectifier terminal, and a capacitor terminal; said rectifier being poled to conduct current toward said junction; each pair of said transfer units being associated with a pair of storage units succeeding in the shifting sequence; said first and second resistor terminals of one of said pair of transfer units being connected respectively to an oppositely designated output terminal of each of said pair of storage units, said first and second resistor terminals of the other of said pair of transfer units being connected to the remaining output terminal of each said pair of storage units respectively, said third resistor terminals of said pair of transfer units both being provided for connection to a source of direct potential, said rectifier terminals of said pair of transfer units both being connected to the triggering input terminal of one of said pair of storage units, said capacitor terminals of said pair of transfer units both being provided to receive negative voltage pulses; said one of said pair of storage units being triggered by a given one of said voltage pulses only when the binary number represented by the conduction state of said one of said pair of storage units differs from the binary number represented by the conduction state of the other of said pair of storage units.

5. In a coded binary decade counter group the combination of at least two multivibrator storage units and at least one transfer unit; each of said storage units having two oppositely designated output terminals and a triggering input terminal, and having two stable states of conduction; said transfer unit comprising a multiterminal potential sensing and selective pulse transmission network having two sensing terminals each connected to a similarly designated output terminal on a different one of said storage units, an input terminal for receiving triggering voltage pulses connected to one triggering input terminal of one of said storage units, and an output terminal for transmitting selected voltage pulses connected through a capacitor to a point of ground potential; whereby voltage pulses applied to said one triggering input terminal are transmitted to ground and made ineffective in triggering said one storage unit when the potentials sensed by said transfer unit are in predetermined relation.

6. A 51*21 coded binary decade counter group comprising the combination of four multivibrator storage units and two transfer units; each of said storage units having two oppositely designated output terminals and a triggering input terminal; each of said transfer units comprising impedance elements including two resistors, a capacitor, and a rectifier connected to a common junction in star relationship and providing at the respective ends of said elements opposite said junction two resistor terminals, a capacitor terminal, and a rectifier terminal; said two resistor terminals of each of said two transfer units being connected to similarly designated output terminals of two of said storage units respectively, said capacitor terminals of said transfer units being connected to ground, said rectifier terminals of said transfer units being connected to the triggering input terminals of two of said storage units; said transfer units shorting triggering voltage pulses supplied to said triggering input terminals to ground at predetermined steps in the coded sequence counting process.

7. In binary digital computing and counting devices the combination of a transfer unit and a plurality of multivibrator storage units; each of said storage units having two oppositely designated output terminals which reside complementally at one of two predetermined potentials during each of two stable storage unit conduction states representing binary number information, and having an input triggering terminal; said transfer unit comprising elements including three resistors, a rectifier, and a capacitor connected to a common junction in star relationship and providing at the respective ends of said elements opposite said junction a first, second, and a third resistor terminal, a rectifier terminal, and a capacitor terminal; said first and second resistor terminals being connected to an output terminal of each of two of said storage units respectively, said third resistor terminal being provided for connection to a source of direct potential, said rectifier terminal being connected to the triggering input terminal of one of said storage units, and said capacitor terminal being provided to receive triggering voltage pulses; said transfer unit transmitting said triggering pulses to the triggering input terminal of said one storage unit only when the binary number information stored by said two storage units is in predetermined relation.

8. In binary digital computing and counting devices the combination of a transfer unit and a plurality of multivibrator storage units; each of said storage units having two oppositely designated output terminals which complementally reside at one of two predetermined potentials during each of two stable storage unit conduction states representing binary number information, and having an input triggering terminal; said transfer unit comprising impedance elements including a first and a second resistor, a capacitor, and a rectifier connected to a common junction in star relationship and providing at the respective ends of said elements opposite said junction a first resistor terminal, a second resistor terminal, a capacitor terminal and a rectifier terminal; said first and second resistor terminals being connected to an output terminal of each of two of said storage units, said capacitor terminal being connected to ground, and said rectifier terminal being connected to the triggering input terminal of a third of said storage units; said transfer unit transmitting triggering voltage pulse supplied to said third storage unit to ground only when the binary number information represented by the conduction states of said two storage units is in a predetermined relation.

9. A transfer unit, comprising a network of impedance elements including three resistors, a rectifier, and a capacitor connected to a common junction and providing at the respective ends of said elements opposite said junction a first, second, and third resistor terminal, a rectifier terminal, and a capacitor terminal, said rectifier being poled to conduct current toward said junction, said transfer unit being adapted for association with a pair of voltage sources each capable of providing voltages of one or the other of two discrete values, said first and second resistor terminals of said transfer unit being connected to sense voltages of said sources, said third resistor terminal of said transfer unit being connected to a source of direct potential, said rectifier terminal of said transfer unit being connected to a source of triggering impulses, said transfer unit transmitting negative voltage pulses to said rectifier terminal only if the voltages represented by each of said two-valued sources are unlike.

10. Potential-sensing apparatus, comprising a pair of transfer units, said transfer units each comprising impedance elements including three resistors, a rectifier, and a capacitor connected to a common junction and providing at the respective ends of said elements opposite said junction a first, second, and third resistor terminal, a rectifier terminal, and a capacitor terminal, said rectifier being poled to conduct current toward said junction, each pair of said transfer units being associated with a pair of double-valued voltage sources, said first and second resistor terminals of one of said pair of transfer units being connected respectively to an oppositely designated output terminal of each of said pair of voltage sources, said first and second resistor terminals of the other of said pair of transfer units being connected to the remaining output terminal of each said pair of voltage sources respectively, said third resistor terminals of said pair of transfer units both being provided for connection to a source of direct potential, said rectifier terminals of said pair of transfer units both being connected to define an output terminal for said apparatus, said capacitor terminals of said pair of transfer units both being adapted to receive negative voltage pulses, an output impulse appearing at said output terminal in response to one of said negative voltage pulses only when the voltage value of one of said pair of double-valued voltage sources instantly differs from the voltage value of the other of said pair of double-valued voltage sources.

References Cited in the file of this patent

UNITED STATES PATENTS

| | | |
|---|---|---|
| 2,521,788 | Grosdoff | Sept. 12, 1950 |
| 2,535,303 | Lewis | Dec. 26, 1950 |
| 2,565,497 | Harling | Aug. 28, 1951 |
| 2,580,771 | Harper | Jan. 1, 1952 |
| 2,584,363 | Mumma | Feb. 5, 1952 |
| 2,585,630 | Crosman | Feb. 12, 1952 |

OTHER REFERENCES

Proc. of I. R. E., "A Digital Computor for Scientific Applications," by West et al., pp. 1452–1460, December 1948.

Article: "Gate Type Shifting Register," by Knapton and Stevens, Electronics, vol. 22, December 1949, pp. 186, 188, 190 and 192.

Waveforms, published 1949, by McGraw-Hill Co., vol. 19, Radiation Laboratories Series, pp. 365 and 366.